United States Patent [19]

Ring

[11] 4,045,234
[45] Aug. 30, 1977

[54] PROCESS FOR PRODUCING HIGH DENSITY SINTERED ALUMINA

[75] Inventor: Terry A. Ring, Pleasanton, Calif.

[73] Assignee: Kaiser Aluminum & Chemical Corporation, Oakland, Calif.

[21] Appl. No.: 716,723

[22] Filed: Aug. 23, 1976

[51] Int. Cl.$^2$ .......................... C01F 7/06; C01F 7/46
[52] U.S. Cl. ...................... 106/62; 106/73.4; 423/111; 423/121; 423/625; 423/626
[58] Field of Search ............ 423/625, 111, 121, 626; 106/73.4, 62

[56] References Cited

U.S. PATENT DOCUMENTS

| | | | |
|---|---|---|---|
| 2,069,060 | 1/1937 | Fessler | 423/121 |
| 3,384,454 | 5/1968 | Barrington | 423/625 |
| 3,637,406 | 1/1972 | Basley | 423/628 |
| 3,655,330 | 4/1972 | Rettew et al. | 423/625 |
| 3,846,146 | 11/1974 | Hunting et al. | 106/73.4 |
| 3,929,496 | 12/1975 | Asano et al. | 106/73.4 |
| 3,973,972 | 8/1976 | Wilson | 106/73.4 |
| 3,982,955 | 9/1976 | Mansmann et al. | 106/73.4 |

Primary Examiner—Herbert T. Carter
Attorney, Agent, or Firm—Paul E. Calrow; Andrew E. Barlay

[57] ABSTRACT

Sintered alumina of low porosity and Na content is made from calcined alumina of 2-6 micron average particle size and about 0.2-1% by weight $Na_2O$ content by treating the calcined alumina with a synergistically acting combination of a magnesium salt and a boron compound. Suitable magnesium salts include magnesium halides, nitrate, sulfate, acetate and stearate, the water-soluble salts being preferred. As boron compound $H_3BO_3$ or $B_2O_3$ can be employed. The quantity of magnesium salt in the combination, calculated as Mg, is kept in the range of about 0.01-0.3% by weight of $Al_2O_3$, while the boron content, calculated as $B_2O_3$, is maintained in the range of about 0.1-1% by weight of $Al_2O_3$. Used of the synergistically acting combination in the indicated range allows manufacture of sintered alumina products of less than about 3% total porosity and less than about 0.03% by weight Na content.

7 Claims, No Drawings

PROCESS FOR PRODUCING HIGH DENSITY SINTERED ALUMINA

BACKGROUND OF THE INVENTION

Sintered alumina is commonly employed in the production of refractory shapes, spark plugs and electrical insulating elements. Most of these applications require an alumina product of low porosity and high purity. These aluminas are usually prepared from alumina hydrate derived from the Bayer process, which involves the digestion of aluminiferous ores with a caustic solution, such as sodium hydroxide. Digestion results in a sodium aluminate solution from which the alumina hydrate is recovered by precipitation. The resulting alumina hydrate is usually contaminated with sodium impurities and the impurity content, calculated as $Na_2O$, is generally in the range of about 0.2-1.0% by weight on $Al_{12}O_3$ basis. This impurity content is undesirable for many applications, particularly when the sintered alumina made from this type of hydrate is employed for refractory or electrical end uses. It has already been known that when a boron compound, such as $B_2O_3$, is incorporated in alumina hydrate and the mixture is calcined, at high temperatures a significant quantity of the sodium impurity is removed in volatile sodium borate form. Thus, U.S. Pat. No. 2,069,060 (Jan. 26, 1937) and U.S. Pat. No. 3,384,454 (May 21, 1968) disclose the preparation of sintered, alumina materials of 0.02-0.05% residual $Na_2O$ content by incorporating $B_2O_3$ in alumina hydrate of 0.1-0.6% $Na_2O$ content, followed by calcination of the mixture in excess of about 1300° C.

Sintered alumina can be prepared by calcination of alumina hydrate at temperatures in excess of about 1400° C, generally in the range of 1600° and 1900° C. Sintering of the commonly available alumina hydrate having an average particle size in the range of about 25-50 microns, results in a product of high porosity generally in the range of 10-15% by volume and a density which renders it unsuitable for many applications. To improve these properties of the sintered alumina it has been found advantageous in the past to subject the hydrate to an intermediate calcination step, for example, at 900°-1100°, followed by a particle size reduction treatment, such as grinding, to an average particle size of about 1-10 microns. The ground, calcined alumina, commonly referred to as refractory grade alumina, is then sintered and the produced product will have slightly improved density and porosity (7-12% by volume) characteristics. The improvements attained by the above-described treatment were still found to be inadequate. To further improve the porosity characteristics of sintered aluminas made from refractory grade alumina the prior art has incorporated densifiers in the ground calcined alumina prior to sintering. The densifiers, generally magnesium compounds, act as grain growth inhibitors during the sintering process and produce a sintered alumina of increased density and reduced porosity. Thus, the prior art has prepared sintered, refractory grade aluminas having a porosity of 5-9% by volume by addition of about 1-5% by weight magnesium salt to the alumina. While the addition of a magnesium-based densifier improved the porosity of the sintered, refractory grade alumina, the incorporation of a relatively high quantity of magnesium cation in the alumina resulted in a product of reduced utility. To overcome the difficulties associated with the prior art processes a method has been suggested in U.S. Pat. No. 3,655,330 (Apr. 11, 1972) resulting in a high purity and high density sintered alumina. According to this reference in order to obtain a sintered alumina of high purity and density, an alpha-alumina precursor, such as high purity $Al(NO_3)_3 \cdot 9H_2O$, is milled in a fluid energy mill, followed by calcination at 800°-1200° C in an atmosphere of steam. The calcined product is mixed with 0.1% grain growth inhibitor, such as a magnesium salt, then this mixture is shaped at 2000-30,000 p.s.i.g., followed by sintering at about 1300°-1600° C. The resulting product, as shown, exhibits purities in excess of 99.9% and skeletal densities greater than 3.92 g/cc. In order to obtain these desirable properties an extremely pure precursor has to be employed and the precursor has to be calcined in an atmosphere of steam. The requirement of high purity precursor and the required process steps render this process economically unattractive, particularly where large quantities of sintered, high purity and dense alumina are to be produced for use in the refractories industry.

It has now been found that a high purity and dense sintered alumina can be readily made from a Bayer process alumina hydrate precursor of 0.2-1.0% by weight $Na_2O$ content (on $Al_2O_3$ basis) by incorporating in calcined alumina made from the precursor, a synergistically acting combination of magnesium salt and boron compound followed by sintering at about 1650°-1850° C. The synergistic effect of the mixture is exhibited in the extremely low residual $Na_2O$ level of the sintered alumina which cannot be achieved by the addition of the boron compound alone; the porosity of the sintered product, due to the synergism of the mixture, can also be reduced to levels unattainable by the single addition of a magnesium salt densifier.

BRIEF SUMMARY OF THE INVENTION

Sintered alumina shapes or grains of high purity and low porosity are made by incorporating in calcined, refractory grade alumina of 2-6 micron average particle size and about 0.2-1.0% by weight $Na_2O$ content a synergistically acting combination of a magnesium salt and a boron compound. The quantity of magnesium salt, calculated as Mg, is kept within the range of about 0.01-0.3% by weight of $Al_2O_3$, while the amount of boron compound, calculated as $B_2O_3$, is within the range of about 0.1-1% by weight of $Al_2O_3$. The magnesium salts are selected from water-soluble and insoluble magnesium compounds which at the sintering temperatures decompose without leaving an anionic impurity in the sintered alumina, while the boron compounds include $H_3BO_3$ and $B_2O_3$. The sintered alumina treated with the synergistically acting combination of magnesium salts and boron compounds will have an Na contant of less than about 0.03% by weight of $Al_2O_3$ and a total porosity of less than about 3% by volume when sintered at about 1650°-1850° C.

DETAILED DESCRIPTION OF THE INVENTION

This invention relates to the production of high purity and dense sintered alumina. More particularly, it concerns the preparation of sintered alumina shapes or grain of less than about 0.03% Na content and a less than about 3% by volume porosity from calcined alumina having an $Na_2O$ content in the range of about 0.2-1.0% by weight and an average particle size of about 2-6 microns. The high purity and dense sintered alumina is prepared by addition to calcined alumina a synergistically acting densifier composition made from a combination of magnesium salts and boron compounds, followed by sintering.

For the purposes of the invention, the expression "calcined alumina" refers to an alumina product made from a Bayer process alumina hydrate precursor and characterized by an $Na_2O$ content in the range of about 0.2-1.0% by weight of $Al_2O_3$, an average particle size in the range of about 2-6 microns and an alumina ($Al_2O_3$) content of about 99% by weight.

The calcined alumina employed in the instant process is usually derived from Bayer process alumina hydrate precursor which has been obtained in the digestion of bauxite or other aluminous ores with an alkaline agent, for example NaOH. It is, however, to be understood that for the preparation of the calcined alumina, hydrated aluminas other than those produced by the Bayer process can be utilized equally well.

Calcination of the alumina is usually accomplished in the temperature range of about 750°-1200° C to obtain a calcined product of less than about 0.5% percent by weight water content. The calcined product, if necessary, is then ground to an average particle size in the range of about 2-6 microns. This grinding is usually accomplished in well-known equipment, for example in ball mills.

The calcined alumina is then treated with a synergistically performing combination made from a magnesium salt and a boron compound. Magnesium salts, suitable for accomplishing the objects of the present invention, i.e. the production of a high purity sintered alumina of low density, include water-soluble and essentially water-insoluble magnesium compounds. Typical water-soluble magnesium salts, which can form the magnesium-containing portion of the synergistic mixture, include $MgCl_2$, $MgSO_4$, $MgBr_2$, $Mg(NO_3)_3$, and magnesium acetate; while the essentially water-insoluble magnesium compounds can be selected from $MgF_2$, $MgO$, $MgCO_3$ and magnesium stearate. Other water-soluble and essentially water-insoluble magnesium compounds can also be utilized provided they do not leave residual anionic impurities in the sintered alumina product. By this, such magnesium compounds are understood where the anion decomposes and/or volatilizes at the sintering temperatures employed. Typical magnesium compounds satisfying the above criterion include those which possess an organic radical, for example magnesium oxalate, laurate or oleate. Under the term "essentially water-insoluble" those magnesium salts are to be understood, which have a solubility of less than about 0.1 gram per 100 ml water at 20° C.

It has been found that while the water-soluble and essentially water-insoluble magnesium salts both perform satisfactorily, optimum results, in terms of sintered alumina porosity and Na level reduction, can be obtained when aqueous solutions of magnesium salts are utilized. Incorporation and uniform distribution of the magnesium salt in the calcined alumina can be more readily achieved when the calcined alumina is contacted with an aqueous solution.

The boron compounds which are suitable for incorporation in the synergistically acting combination include $B_2O_3$ and $H_3BO_3$.

The quantity of magnesium salt in the synergistically acting combination, calculated as Mg, is generally selected to be in the range of about 0.01-0.3% by weight of $Al_2O_3$. Optimum reslts can be achieved when the Mg quntity to be incorporated in the calcined alumina is within the range of about 0.01-0.2% by weight of $Al_2O_3$. The quantity of boron in the mixture, calculated as $B_2O_3$, is selected to be within the range of about 0.1-1% by weight of $Al_2O_3$, preferably within the range of about 0.2-0.7% by weight.

Incorporation of the synergistically acting combination in the calcined alumina can be accomplished in several ways. For example, if the calcined alumina is to be ground to the 2-6 micron average particle size, the synergistically acting combination whether in dry form or in aqueous solution can be added to the ball mill during grinding of the alumina. This will assure good mixing and uniform distribution of the treating agents with the calcined alumina. It is also possible to add the synergistic mixture in solution or in dry form to calcined alumina which has already been ground or which does not have to be ground due to its satisfactory particle size. In any case care is to be taken to obtain uniform distribution of the treating agents within the calcined alumina.

For many applications it is preferred to shape the calcined alumina prior to sintering. These shaping operations can include the preparation of pellets, spheres, tablets or any other desired shape. The treating agents whether in solution or in particulate form, can also be incorporated in the shapes or grains during the shaping step, in case an aqueous solution of the magnesium salt-boron compound is used, impregnation of the already prepared shapes or grains with the solution is also possible.

It is not necessary for the purposes of the invention to add the magnesium salt and the boron compound in admixture. Each of the components of the combination can either be added singly or in combination with each other. The results in either case were found to be essentially the same, provided uniform distribution of the individual components or the mixture in the calcined alumina is attained.

After incorporation of the synergistically acting combination in the calcined alumina, the alumina, whether in shaped or in grain form is sintered in conventional equipment, for example in rotary or shaft kilns. To obtain the desired sintered alumina sintering temperatures in the range of about 1600° and 1900° C are employed, the range of about 1650°-1850° C being preferred. The time employed for sintering varies with the temperature utilized, in general kiln residence times of about 1-25 hours are found to provide satisfactory results.

The sintered alumina, which has been treated with the synergistically acting magnesium salt-boron compound combination, will exhibit an Na content of 0.03% or less. This low Na content cannot be achieved with the sole addition of the same quantity of boron compound and is attainable only when the combination of the instant invention is employed. The same applies to the low porosity of the sintered alumina; single addition of magnesium salts, although capable of providing lowered porosity, cannot reduce the porosity of the final product to levels which are obtained by the addition of the magnesium salt-boron compound combination. These results, which are further demonstrated in the Examples below, clearly show the synergism obtained by the application of the magnesium salt-boron compound combination of the present invention.

EXAMPLE I

Calcined alumina characterized by an $Al_2O_3$ content of 99.1% by weight, an $Na_2O$ level of 0.60% by weight and a loss on ignition (1 hour at 1000° C after being dried at 300° C) of 0.20% by weight, was ball milled for several hours. The ground material, having a 2-6 micron average particle size, was then shaped into pellets of about 1.3 cm average diameter using water as shaping liquid. The formed pellets were dried at about 150° C, then sintered in a kiln for about 1-4 hours at about 1800° C. The sintered shapes were tested for porosity and Na content and the results obtained were used as control and reported in Table I.

EXAMPLE II

Calcined alumina, such as used in the previous Example, was ground in admixture with 0.5% by weight $B_2O_3$. The ground mixture was pelletized and the pellets of about 1.3 cm average diameter were dried at about 150° C, then sintered at about 1800° C for about 1-4 hours. The porosity of the shapes and their Na content were checked and the results reported in Table I.

EXAMPLE III

To test the porosity reducing effect of individual magnesium salts, a series of pellets were prepared using a different magnesium salt in each set. In case of water-insoluble magnesium salts the salt was incorporated in the calcined alumina, such as described in Example I, during grinding, while the water-soluble magnesium salts were dissolved in water and added to the calcined alumina during shaping. The formed pellets of each set were dried then sintered at 1800° C for about 1-4 hours.

I. Water-Soluble Magnesium Salts (a) $MgCl_2$ additive: In this test 0.098% by weight $MgCl_2$ was incorporated in the shapes, corresponding to an 0.03 percent Mg content. The $MgCl_2$ was dissolved in water and added to the calcined and ground alumina during shaping. The pellets were dried at 150° then sintered at 1800° C for about 1-4 hours. The porosity and the Na content of the sintered shapes are shown in Table I.

(b) $Mg(NO_3)_2$ additive: In this test 0.19% $Mg(NO_3)_2$, corresponding to 0.03% Mg, was incorporated in the shapes in the same manner as shown in (a) above. The porosity and Na content of the sintered pellets are shown in Table I.

(c) Mg-acetate additive: For this test 0.18% $Mg(C_2H_3O_2)_2$, corresponding to 0.03% Mg, was used as additive. Shaping and treatment of the pellets proceeded in the same manner as shown under (a) and (b). The results are reported in Table I.

II. Water-insoluble magnesium salts

In these sets of pellets the magnesium salt was incorporated during grinding of the calcined alumina. Pelletizing and treatment of the nodules (i.e. drying and sintering) was done in the same manner as shown above. The porosity and Na test results are shown in Table I.

(a) $MgF_2$ additive: In this test 0.05% $MgF_2$, corresponding to 0.03% Mg, was incorporated in the calcined alumina.

(b) Mg-stearate additive: For this test 0.7% Mg-stearate, corresponding to 0.03% Mg, was added to the calcined alumina.

(c) MgO additive: The calcined alumina for this experiment was combined with 0.05% MgO corresponding to 0.03% Mg.

This Example is presented to show the synergistic effect of magnesium salt-boron compound combinations on the porosity and the Na content of sintered alumina. In all instances reported in this Example the $B_2O_3$ amount incorporated in calcined alumina was 0.5% by weight of $Al_2O_3$ and the quantity of Mg was 0.03% by weight of $Al_2O_3$. In those instances where the magnesium salt utilized was water-soluble, the $B_2O_3$ component of the synergistic combination was added to the grinding step, while the magnesium salt was dissolved in water and used as shaping liquid. Water-insoluble magnesium salts were thoroughly mixed with the $B_2O_3$ component and the mixture was added to the grinding step. In all instances the shapes made were dried at about 150° C then sintered at about 1800° C for about 1-4 hours. The porosity of the sintered shapes and their Na content are reported in Table I.

The results presented in Table I unequivocally show the synergistic effect obtained in terms of Na content decrease and porosity reduction by using the novel combination of magnesium salts and boron compounds.

The synergistic effect achieved by the practice of the instant invention becomes even more unique and unobvious when it is considered that addition of $Mg_3(BO_3)_2$ to calcined alumina, even in quantities manifold of the Mg and $B_2O_3$ contents described herein, fail to impart the synergistic effect. The results obtained by addition of water-insoluble $Mg_3(BO_3)_2$ in different concentrations during grinding of calcined alumina, followed by shaping, drying and sintering of the shapes, are also shown in Table II.

It is to be understood that while the Examples involve shapes made from the calcined alumina, the same results can be readily obtained with grains or shapes other than pellets and the Examples are not intended to limit the scope of the application thereto.

Table 1
Effect of Single Additives and Synergistic Combinations of Magnesium Salt-Boron Compound Additives on the Porosity and Na Content of Sintered Alumina Shapes

| Additive* | Porosity** in % by volume | Na*** content in % by weight |
|---|---|---|
| None | 7.6 | 0.15 |
| $B_2O_3$ | 7.5 | 0.07 |
| $MgCl_2$ | 3.5 | 0.12 |
| $MgCl_2 - B_2O_3$ | 1.8 | <0.03 |
| $Mg(NO_3)_2$ | 3.2 | 0.15 |
| $Mg(NO_3)_2 - B_2O_3$ | 2.0 | <0.03 |
| $Mg(C_2H_3O_2)_2$ | 3.0 | 0.11 |
| $Mg(C_2H_3O_2)_2 - B_2O_3$ | 1.9 | <0.03 |
| $MgF_2$ | 3.6 | 0.14 |
| $MgF_2 - B_2O_3$ | 2.3 | <0.03 |
| Mg-stearate | 3.8 | 0.15 |
| Mg-stearate-$B_2O_3$ | 2.5 | <0.03 |
| MgO | 4.1 | 0.14 |
| MgO - $B_2O_3$ | 2.8 | <0.03 |

*In all instances the $B_2O_3$ quantity is 0.5% by weight of $Al_2O_3$ and the Mg level is 0.03% by weight $Al_2O_3$.
**Porosity was determined by Hg displacement technique.
***Measured by emission spectroscopy.

Table II
Effect of $Mg_3(BO_3)_2$ on the Porosity and Na Content of Sintered Alumina Shapes

| $Mg_3(BO_3)_2$ additive % by weight | Porosity in % by volume | Na content in % by weight |
|---|---|---|
| 0.07* | 6.3 | 0.13 |
| 1.37** | 3.5 | 0.6 |

*corresponds to 0.03% Mg
**corresponds to 0.5% $B_2O_3$

What is claimed is:

1. A process for producing sintered alumina shapes or grains of low porosity and reduced Na content which comprises treating a calcined alumina, resulting from the calcination of a Bayer process alumina hydrate precursor, possessing a 2-6 micron average particle size and having an $Na_2O$ content in the range of about 0.2-1.0% by weight of $Al_2O_3$ with a synergistically acting combination of a boron-free magnesium salt and a boron compound, wherein the magnesium salt is selected from the group consisting essentially of water-soluble and essentially water-insoluble magnesium salts which during sintering of the alumina shapes decompose without leaving anionic impurities in the sintered alumina shape and wherein the boron compound is $H_3BO_3$ or $B_2O_5$, wherein in the combination, the quantity of magnesium salt, calculated as Mg, is kept in the range of about 0.01-0.3% by weight of $Al_2O_3$ and the amount of boron compound, calculated as $B_2O_3$, is maintained in the range of about 0.1-1.0% by weight of $Al_2O_3$, shaping and sintering the calcined alumina for a time period of 1 to 25 hours within the temperature range of about 1600° and 1900° C, and recovering a sintered alumina having a porosity of less than about 3% by volume and an Na content of less than about 0.03% by weight of $Al_2O_3$.

2. Process of claim 1, wherein the components of the synergistically acting combination are used in admixture for the treatment of the calcined alumina.

3. Process of claim 1, wherein the components of the synergistically acting combination are used separately for the treatment of the calcined alumina.

4. Process of claim 1, wherein the boron compound of the synergistically acting combination is added to calcined, unground alumina which is then ground to 2-6 micron average particle size in admixture with the boron compound.

5. Process of claim 4, wherein the magnesium salt component of the synergistically acting combination is an essentially water-insoluble salt and it is added to calcined, unground alumina, which is then ground to 2-6 micron average particle size in admixture with the magnesium salt.

6. Process of claim 1, wherein the magnesium salt component of the synergistically acting combination is a water-soluble magnesium salt and it is added in aqueous solution to the calcined alumina of 2-6 micron average particle size during shaping.

7. Process of claim 6, wherein the aqueous solution of the water-soluble magnesium salt is used to impregnate shapes made from calcined alumina of 2-6 micron average particle size.

* * * * *